(12) United States Patent
Sandhya Rani Siva Raju et al.

(10) Patent No.: US 11,297,590 B2
(45) Date of Patent: Apr. 5, 2022

(54) MULTILATERATION METHOD, MULTILATERATION DEVICE AND MULTILATERATION SYSTEM

(71) Applicant: Hughes Network Systems, LLC, Germantown, MD (US)

(72) Inventors: Srinivas Sandhya Rani Siva Raju, Germantown, MD (US); Ajith Edakandi, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/559,049

(22) Filed: Sep. 3, 2019

(65) Prior Publication Data

US 2020/0280949 A1 Sep. 3, 2020

Related U.S. Application Data

(60) Provisional application No. 62/812,556, filed on Mar. 1, 2019.

(51) Int. Cl.
| | | |
|---|---|---|
| *H04M 11/04* | (2006.01) | |
| *H04W 64/00* | (2009.01) | |
| *H04W 52/24* | (2009.01) | |
| *H04B 17/318* | (2015.01) | |
| *H04W 4/029* | (2018.01) | |

(52) U.S. Cl.
CPC .......... *H04W 64/00* (2013.01); *H04B 17/318* (2015.01); *H04W 4/029* (2018.02); *H04W 52/242* (2013.01)

(58) Field of Classification Search
CPC ... H04W 40/005; H04W 40/10; H04W 40/22; H04W 40/248; H04W 48/12; H04W 56/00; H04W 56/0015; H04W 56/002; H04W 84/18; H04W 8/005; H04W 4/025; H04W 52/223; H04W 52/225; H04W 64/00
USPC ............ 455/404.2, 522, 456.6, 456.1, 422.1, 455/456.5, 67.1, 90.1
See application file for complete search history.

(56) References Cited

U.S. PATENT DOCUMENTS

| | | | | |
|---|---|---|---|---|
| 4,642,648 | A * | 2/1987 | Holland | G01S 13/781 342/455 |
| 6,016,118 | A * | 1/2000 | Jackson | G01C 15/00 342/357.29 |
| 8,643,540 | B2 * | 2/2014 | Pattabiraman | G01S 19/11 342/357.29 |
| 2001/0022558 | A1* | 9/2001 | Karr, Jr. | G01S 1/028 342/450 |
| 2008/0218407 | A1* | 9/2008 | Norda | G01S 5/0036 342/357.46 |

(Continued)

*Primary Examiner* — Joseph Arevalo
(74) *Attorney, Agent, or Firm* — Global IP Counselors, LLP

(57) ABSTRACT

A multilateration method basically includes receiving a signal strength indicator for at least one client wireless device from a plurality of access point devices, and calculating a position of the at least one client wireless device based on the signal strength indicator for the at least one client wireless device, prestored positions of the access point devices and a radio transmission parameter. The radio transmission parameter is obtained as a value that minimizes an error between a calculated position of at least one reference wireless device and a prestored position of the at least one reference wireless device.

15 Claims, 10 Drawing Sheets

(56) References Cited

U.S. PATENT DOCUMENTS

| | | | |
|---|---|---|---|
| 2009/0088087 A1* | 4/2009 | Dishongh | G01S 5/0252 |
| | | | 455/90.1 |
| 2009/0303117 A1* | 12/2009 | Boiero | G01S 5/0036 |
| | | | 342/357.64 |
| 2012/0077513 A1* | 3/2012 | Rizzello | H04W 64/00 |
| | | | 455/456.1 |
| 2012/0164952 A1* | 6/2012 | Lee | H04W 24/08 |
| | | | 455/67.11 |
| 2013/0005349 A1* | 1/2013 | Sanders | G01S 5/12 |
| | | | 455/456.1 |
| 2014/0059405 A1* | 2/2014 | Syu | G11C 16/349 |
| | | | 714/773 |
| 2016/0323754 A1* | 11/2016 | Friday | H04W 16/28 |
| 2016/0358455 A1* | 12/2016 | Ball | G01S 5/0252 |
| 2017/0070971 A1* | 3/2017 | Wietfeldt | H04W 64/00 |
| 2019/0380043 A1* | 12/2019 | Hassan | G06F 21/552 |

\* cited by examiner

```
Main Code:
#Trilateration algorithm: Let transmitters are at points A, B, and C, which have
coordinates (xa, ya), (xb, yb), and (xc, yc).
#Position of the user (x, y) can be obtained by the following Matlab code:

import numpy as np
import matplotlib.pyplot as plt
#add a noise to positions:
epsilon = 0.0001;
noise = epsilon*(np.random.rand());
#AP co-ordinates:
#AP1:(0.3,9.35)
#AP2:(0.28,3.66)
#AP3:(6.68,4.51)
#AP4:(6.64,1.93)
xa=1
xb=5
xc=9
ya=3
yb=6
yc=3
plt.plot([xa, xb, xc],[ya, yb, yc],'bs')
xp = [xa, xb, xc]
yp = [ya, yb, yc]

xa = xp[0]+noise; ya = yp[0]+noise;
xb = xp[1]+noise; yb = yp[1]+noise;
xc = xp[2]+noise; yc = yp[2]+noise;

ptx=-30.5 #Average wifi ap received signal at a distance of <1m  ⎫
n=2.5 #Pathloss coefficient                                       ⎬ A10
freq = 2.4                                                        ⎭
def rssi(**clients):
    for c in clients:
        if int(c) == 1:
            rmseTotal = 0
        print(clients[c])
        rssi = clients[c]
        #To take avg if rssi values are missing
        if rssi[0] == 0:
            rssi[0] = (rssi[1]+rssi[2])/2
        elif rssi[1] == 0:
            rssi[1] = (rssi[0]+rssi[2])/2
        elif rssi[2] == 0:
            rssi[2] = (rssi[0]+rssi[1])/2
        #Distance from AP1       ⎫
        if freq == 5:             |
            ptx_new = ptx - 6.5   |
        x1=(ptx-rssi[0])/(10*n)   |
        da=pow(10,x1)             |
        #Distance from AP2        ⎬ A12
        x1=(ptx-rssi[1])/(10*n)   |
        db=pow(10,x1)             |
        #Distance from AP3        |
        x1=(ptx-rssi[2])/(10*n)   |
        dc=pow(10,x1)            ⎭
```

FIG. 5A

```
        #Solving simultaneous equations
        va = ((db*db-dc*dc) - (xb*xb-xc*xc) - (yb*yb-yc*yc)) / 2
        vb = ((db*db-da*da) - (xb*xb-xa*xa) - (yb*yb-ya*ya)) / 2
        temp1 = vb*(xc-xb) - va*(xa-xb)
        temp2 = (ya-yb)*(xc-xb) - (yc-yb)*(xa-xb)
        dmse = [da, db, dc]                                          ⎫
        #Estimated user position:                                    ⎬ A14
        ycorr = temp1 / temp2
        xcorr = (va - ycorr*(yc-yb)) / (xc-xb)
        print("X co-ordinate: ",xcorr)
        print("Y co-ordinate: ",ycorr)                               ⎭
        #RMSE part                                                   ⎫
        aps=3
        mse=0
        for i in range(aps):                                         ⎬ A16
            dxcorr = pow((pow((xcorr-xp[i]),2)+pow((ycorr-yp[i]),2)),0.5)
            mse+=pow((dxcorr-dmse[i]),2)
        rmse = pow((mse/aps),0.5)
        print("RMSE: ",rmse)                                         ⎭
        rmseTotal = rmseTotal + rmse
        print("rmseAvg:",rmseTotal/9)
        plt.plot(xcorr, ycorr, 'ro')
    plt.legend(['AP locations','Client locations'])
    plt.show()
#Sample client rssi_val from feed reader
clients = {
'1':[-43, -44, -30],
'2':[-31, -29, -30],
'3':[-50, -55, -52],
'4':[-61, -63, -59],
'5':[-41, -32, -31],
'6':[-31, -33, -32],
'7':[0, -32, -45],
'8':[-56, -56, 0],
'9':[-53, -56, -60]
}
rssi(**clients)
```

FIG. 5B

```
Optimizing Code:
import numpy as np
import matplotlib.pyplot as plt
import time add a noise to positions:
epsilon = 0.0001;
noise = epsilon*(np.random.rand());
#AP co-ordinates:
#AP1:(0.3,9.35)
#AP2:(0.28,3.66)
#AP3:(6.68,4.51)
#AP4:(6.64,1.93)
xa=7
xb=5
xc=9
ya=6
yb=1
yc=1
#plt.plot([xa, xb, xc],[ya, yb, yc],'bs')
xp = [xa, xb, xc]
yp = [ya, yb, yc]

xa = xp[0]+noise; ya = yp[0]+noise;
xb = xp[1]+noise; yb = yp[1]+noise;
xc = xp[2]+noise; yc = yp[2]+noise;

#Fixed client locations:
xFixed = [6,6,8]
yFixed = [1,5,1]

noLevels=10
outerCount=0
estimatedValues=[]
n=2 #Pathloss coefficient
minFixedError=[]
errorComp = 0
ptxOpt = -30
nOpt = 1.5
rmseFinal = []
distanceError = []
nPlot=[]
pPlot=[]
while outerCount < noLevels: #To run estimation for overall loop
    ptx=-30 #Average wifi ap received signal at a distance of <1m
    errorEstimate=0
    fixedClientRmse=0
    if outerCount>0:
        n=n+0.25
    nPlot.append(n)
    #Sample client rssi_val from feed reader
    clients = {
'1':[-43, -44, -30],
'2':[-31, -29, -30],
'3':[-50, -55, -52],
'4':[-61, -63, -59],
'5':[-41, -32, -31],
'6':[-31, -33, -32],
'7':[0, -32, -45],
```

FIG. 6A

```
'8':[-56, -56, 0],
'9':[-53, -56, -60]
    } while errorEstimate < noLevels: #To run estimation on 1 parameter at a time if errorEstimate > 0:
        ptx=ptx-0.5
    pPlot.append(ptx)
    fixedClientError = 0
    for c in clients:
        j=0
        rssi = clients[c]
        #Distance from AP1
        x1=(ptx-rssi[0])/(10*n)
        da=pow(10,x1)
        #Distance from AP2
        x1=(ptx-rssi[1])/(10*n)
        db=pow(10,x1)
        #Distance from AP3
        x1=(ptx-rssi[2])/(10*n)
        dc=pow(10,x1)
        #Solving simultaneous equations
        va = ((db*db-dc*dc) - (xb*xb-xc*xc) - (yb*yb-yc*yc)) / 2
        vb = ((db*db-da*da) - (xb*xb-xa*xa) - (yb*yb-ya*ya)) / 2
        temp1 = vb*(xc-xb) - va*(xa-xb)
        temp2 = (ya-yb)*(xc-xb) - (yc-yb)*(xa-xb)
        dmse = [da, db, dc]
        #Estimated user position:
        ycorr = temp1 / temp2
        xcorr = (va - ycorr*(yc-yb)) / (xc-xb)
        #RMSE part
        aps=3
        mse=0
        for i in range(aps):
            dxcorr = pow((pow((xcorr-xp[i]),2)+pow((ycorr-yp[i]),2)),0.5)
            mse+=pow((dxcorr-dmse[i]),2)
        if int(c) == 1:# or int(c) == 4 or int(c) == 8: #Since clients number 2,3 and 7 are fixed and known
            #Calculate error for fixed clients
            fixedClientDistance = pow((pow((xcorr-xFixed[j]),2)+pow((ycorr-yFixed[j]),2)),0.5)
            j+=1
            fixedClientError = fixedClientError + (fixedClientDistance/3)
        rmse = pow((mse/aps),0.5)
        #print("RMSE: ",rmse)
        if int(c) == 1:
            rmseTotal = 0
        rmseTotal = rmseTotal + rmse
    rmseFinal.append(rmseTotal/9)
    distanceError.append(fixedClientError)
    if errorComp == 0:
        errorComp = fixedClientError
    if errorComp > fixedClientError:
        errorComp = fixedClientError
        ptxOpt = ptx
        nOpt = n
        errorEstimate = errorEstimate+1
    outerCount = outerCount+1
print("Ptx Opt: ",ptxOpt)
print("n Opt: ",nOpt)
```

FIG. 6B

MULTILATERATION METHOD, MULTILATERATION DEVICE AND MULTILATERATION SYSTEM

CROSS-REFERENCE TO RELATED APPLICATIONS

This application claims priority to U.S. Provisional Application No. 62/812,556 filed on Mar. 1, 2019. The entire disclosure of U.S. Provisional Application No. 62/812,556 is hereby incorporated herein by reference.

BACKGROUND

Field of the Invention

This invention generally relates to a multilateration method. More specifically, the present invention relates to a multilateration method for calculating a position of a client wireless device based on a signal strength indicator. This invention also relates to a multilateration device and a multilateration system.

Background Information

Wi-Fi is a technology which has been extensively deployed nowadays within distributed enterprises. Though deployed to provide guest Wi-Fi and predominantly enterprise Wi-Fi, retailers are now trying to leverage the Wi-Fi solution to gather actionable customer intelligence. This can be done either in a passive mode, in which customers are not connecting to the Wi-Fi, or via a connected mode. Both provide high levels of insights in terms of customer engagements and customer traffic patterns. A key component of understanding customer instore behavior is to understand the customer traffic flow within the store. This gives the most value to the enterprise as they can track the in-store patterns of a customer which gives information on the most visited area in a store.

SUMMARY

Some access point manufacturers provide solutions for this. For example, some access point manufacturers provide customer location mapping based on Wi-Fi signal. These solutions are basically driven by information provided by the access point manufacturers. However, these solutions a) only work uniquely with access points from the same manufacturer, b) are flawed solutions in some scenarios, or c) require at least four access points for accurate triangulation, which doesn't scale economically. Furthermore, while some solutions provide improved analytics by introducing beamforming and antenna steering, this directly increases the cost of the access points or requires additional hardware. Moreover, it is difficult to accurately perform customer location mapping just with an omnidirectional Wi-Fi antenna. Thus, most of the solutions are highly dependent on the access point placement and/or deployment density.

Generally, the present disclosure is directed to various features of a multilateration method and a multilateration device.

In accordance with one aspect of the present disclosure, a multilateration method basically includes receiving a signal strength indicator for at least one client wireless device from a plurality of access point devices, and calculating a position of the at least one client wireless device based on the signal strength indicator for the at least one client wireless device, prestored positions of the access point devices and a radio transmission parameter. The radio transmission parameter is obtained as a value that minimizes an error between a calculated position of at least one reference wireless device and a prestored position of the at least one reference wireless device.

In accordance with another aspect of the present disclosure, a multilateration device includes a processor configured to receive a signal strength indicator for at least one client wireless device from a plurality of access point devices, the processor being further configured to calculate a position of the at least one client wireless device based on the signal strength indicator for the at least one client wireless device, prestored positions of the access point devices and a radio transmission parameter. The radio transmission parameter is obtained as a value that minimizes an error between a calculated position of at least one reference wireless device and a prestored position of the at least one reference wireless device.

In accordance with another aspect of the present disclosure, a multilateration system includes a plurality of access point devices and a multilateration device. The access point devices are configured to connect to at least one client wireless device and output a signal strength indicator for the at least one client wireless device. The multilateration device is configured to receive the signal strength indicator from the access point devices and calculate a position of the at least one client wireless device based on the signal strength indicator for the at least one client wireless device, prestored positions of the access point devices and a radio transmission parameter. The radio transmission parameter is obtained as a value that minimizes an error between a calculated position of at least one reference wireless device and a prestored position of the at least one reference wireless device.

BRIEF DESCRIPTION OF THE DRAWINGS

Referring now to the attached drawings which form a part of this original disclosure:

FIGS. 5A and 5B illustrate the main code of the multilateration algorithm of the multilateration system shown in FIG. 1;

FIGS. 6A and 6B illustrate the optimizing code of the multilateration algorithm of the multilateration system shown in FIG. 1;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
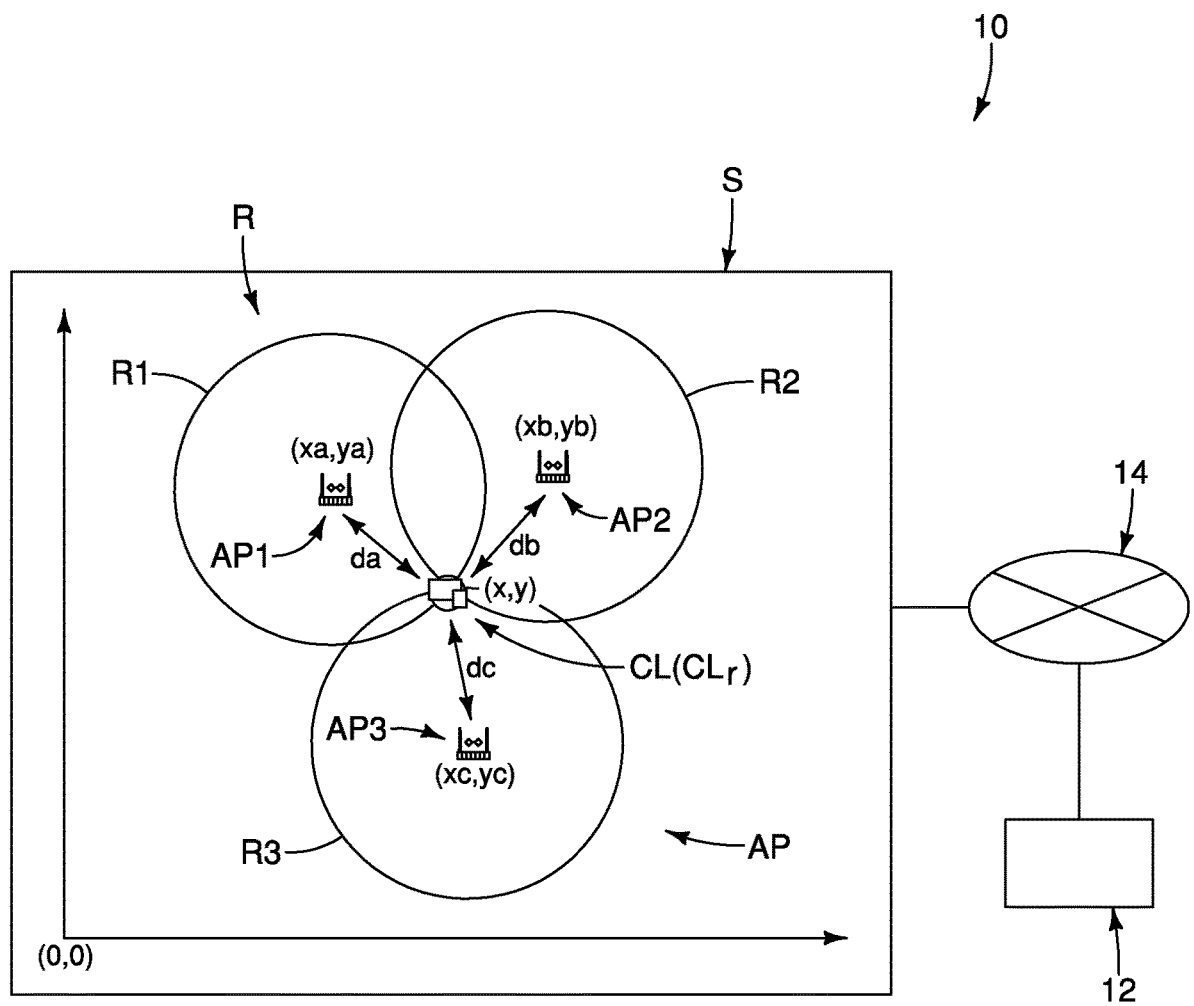
FIG. 1 is a schematic diagram of a multilateration system in accordance with one embodiment of the present disclosure.

Referring initially to FIG. 1, a multilateration system 10 is illustrated that is equipped with a multilateration server 12 (e.g., a multilateration device) in accordance with one embodiment. As illustrated in FIG. 1, the multilateration system 10 also includes a plurality of access points AP (e.g., a plurality of access point devices). In the illustrated embodiment, as illustrated in FIG. 1, three access points AP1, AP2 and AP3 are installed at positions (xa, ya), (xb, yb) and (xc, yc), respectively, in an indoor space S of a store building. The access points AP1, AP2 and AP3 are a networking hardware device that allows at least one wireless devices CL (e.g., client wireless devices) in the indoor space S of the store building to connect to a wired network. In the illustrated embodiment, only one wireless device CL is illustrated for the sake of brevity. The wireless device CL can be any type of wireless devices, such as mobile phones, tablets, personal computers and the like. In the illustrated embodiment, the access points AP1, AP2 and AP3 provide wireless connections using wireless LAN technology, such as Wi-Fi, for the wireless devices CL. Specifically, in the illustrated embodiment, the access points AP1, AP2 and AP3 provides 5 GHz/2.4 GHz dual band wireless LAN, for example. The access points AP1, AP2 and AP3 connect to a network 14, such as the Internet, via a router (not shown), for example. Of course, alternatively, the access points AP1, AP2 and AP3 each can be integrally formed with a router to connect the network 14.

Figure 2:
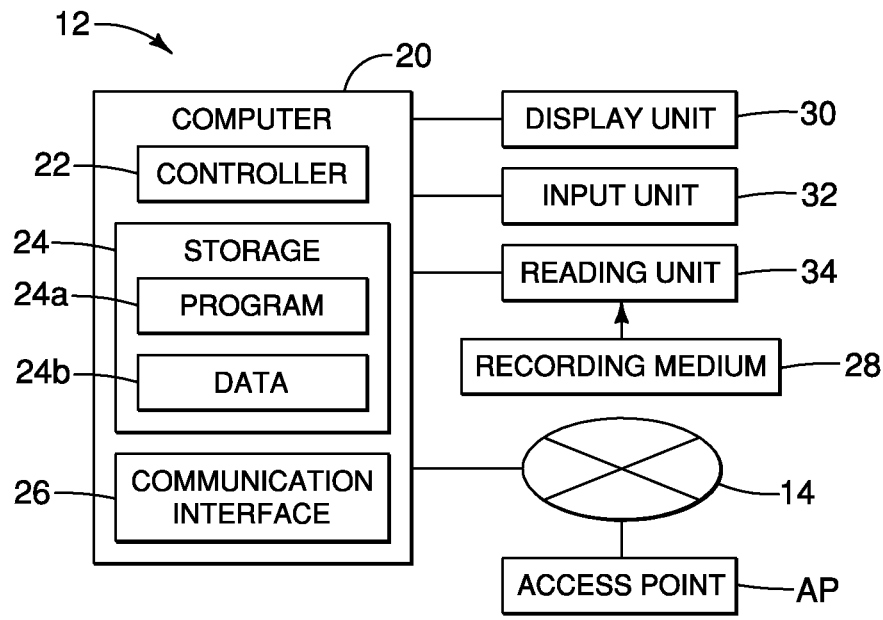
FIG. 2 is a block diagram of a multilateration device of the multilateration system shown in FIG. 1.

In the illustrated embodiment, as illustrated in FIG. 1, the multilateration server 12 is connected to the access points AP1, AP2 and AP3 via the network 14. As illustrated in FIG. 2, the multilateration server 12 includes a computer 20 having an electronic controller 22 (e.g., a processor), a computer data storage 24 and a communication interface or module 26. The terms "controller" and "electronic controller" as used herein refer to hardware that executes a software program and does not include a human. In the illustrated embodiment, the controller 22 includes a processor, such as a CPU. The controller 22 can also include other conventional components such as an input interface circuit, an output interface circuit, and a computer memory such as a ROM (Read Only Memory) and a RAM (Random Access Memory). The processor of the controller 22 is programmed to execute a multilateration algorithm (e.g., a multilateration method) of the present disclosure as discussed below. The memory stores processing results and programs for executing the multilateration algorithm that is run by the processor. Of course, the controller is capable of selectively controlling any of the components of the computer 20 in accordance with a control program. The data storage 24 is a secondary storage, such as a hard disk drive, a solid-state drives and the like, that stores a program 24a for executing the multilateration algorithm, and a data 24b that is received from the access points AP1, AP2 and AP3 for executing the multilateration algorithm and is outputted by executing the multilateration algorithm. The communication interface 26 is an electronic circuit that enables the computer 20 to communicate with the access points AP1, AP2 and AP3 via the network 14.

In the illustrated embodiment, the computer 20 can execute the multilateration algorithm by causing the controller 22 to execute the program 24a that is read from the data storage 24. Alternatively or additionally, the program for the multilateration algorithm can be read from a recording medium 30. The recording medium 30 is an example of a non-transitory computer-readable recording medium, such as an optical disk, a magnetic disk, a nonvolatile semiconductor memory, and can store the program for the multilateration algorithm therein. Furthermore, as illustrated in FIG. 2, the multilateration server 12 also includes a display unit 30 (display) such as a liquid crystal display device, an input unit 32 having an input device such as a keyboard and a mouse, and a reading unit 34 (reader) for reading the program and various data from the recording medium 28. The reading unit 34 is a reader device or the like corresponding to the type of the recording medium 28.

Figure 3:
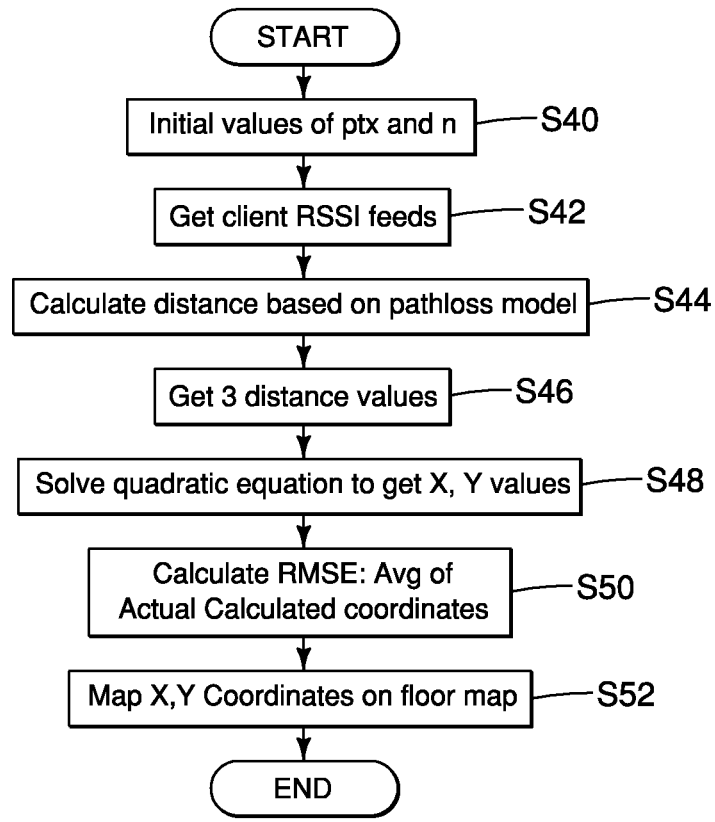
FIG. 3 is a flowchart of a main code of a multilateration algorithm of the multilateration system shown in FIG. 1.
Figure 4:
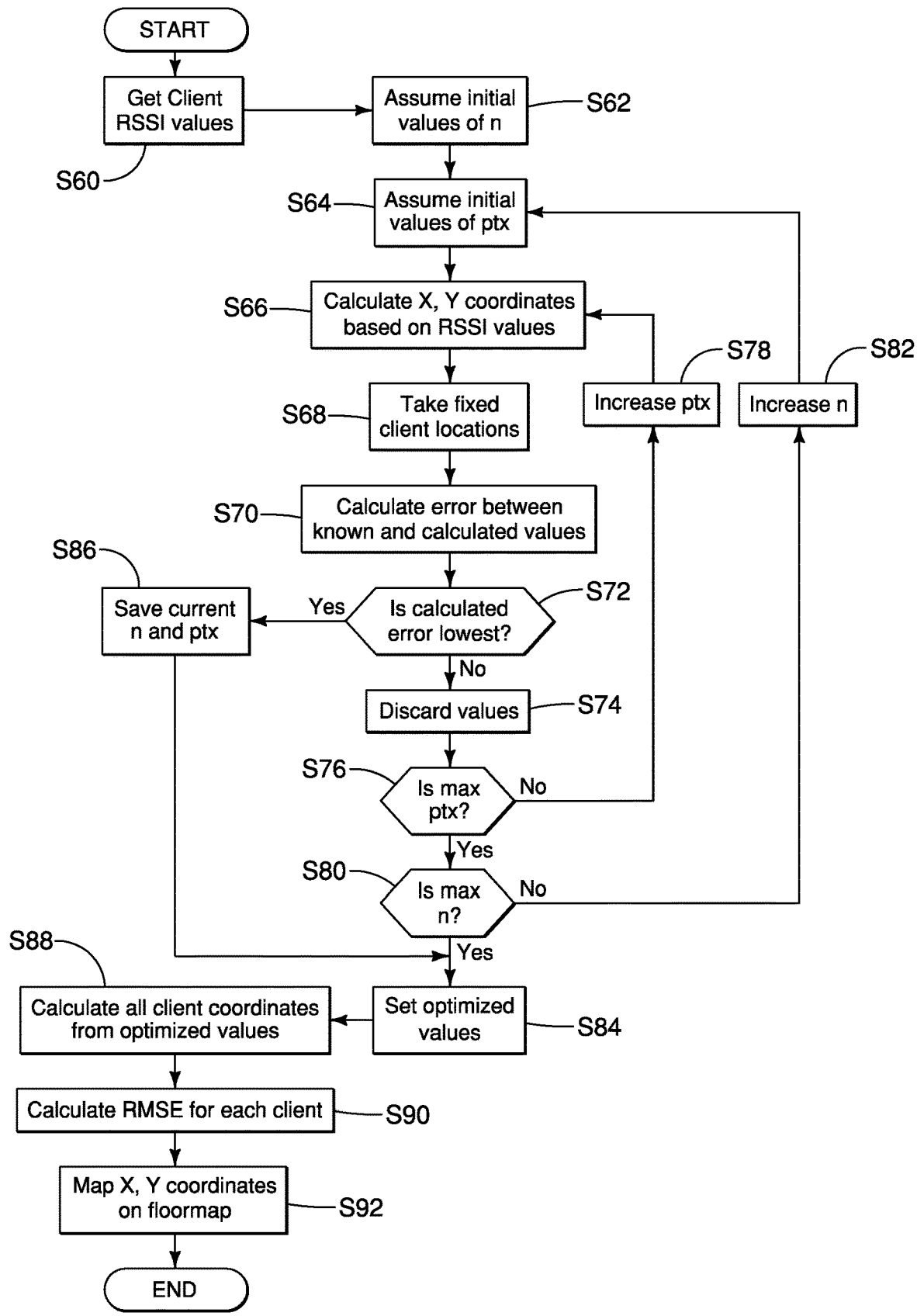
FIG. 4 is a flowchart of an optimizing code of the multilateration algorithm of the multilateration system shown in FIG. 1.

Referring now to FIGS. 3 to 6B, the multilateration algorithm executed by the multilateration server 12 will be explained. FIG. 3 is a flowchart of a main code of the multilateration algorithm of the multilateration system 12. FIG. 4 is a flowchart of an optimizing code of the multilateration algorithm of the multilateration system 12. FIGS. 5A and 5B illustrate the main code of the multilateration algorithm of the multilateration system 12. FIGS. 6A and 6B illustrates the optimizing code of the multilateration algorithm of the multilateration system 12.

In the illustrated embodiment, the multilateration algorithm of the present disclosure determines the positions (x, y) (e.g., client locations) of the wireless devices CL in the indoor space S of the store building (see FIG. 1). Specifically, in the illustrated embodiment, the main code of the multilateration algorithm provides the positions (i.e., location coordinates (x, y)) of the wireless devices CL based on received signal strength indicator (RSSI) values at the access points AP1, AP2 and AP3. The RSSI value indicates an estimated measure of power level that a wireless device is receiving from an access point. In the illustrated embodiment, the main code includes general trilateration or triangulation code. However, the multilateration algorithm does not assume any specific access point configurations and/or placements or floor map details, and thus can be used with any types of access points providing RSSI values of the wireless devices CL.

Furthermore, in the illustrated embodiment, the optimizing code of the multilateration algorithm works on optimizing the trilateration or triangulation of the main code, and optimizes the calculated positions by making certain assumptions on certain fixed wireless devices CL. Specifically, the main function of the optimizing code is to take in samples location feeds and to provide optimized radio transmission parameters, such as transmission power of the access points AP and transmission pathloss coefficients, which provide the optimized localization results. Thus, the multilateration algorithm of the present disclosure can optimize Wi-Fi indoor triangulation for wireless device positions. In the illustrated embodiment, these main and optimizing code can be used for 2.4 and 5 GHz access points AP.

In general, the following two types of calculation methods utilizing only RSSI values to determine client locations are used in the field of client location mappings:

1) RSSI Trilateration: This is the most straight forward method, in which the distance from each access point AP is estimated based on the received RSSI by using a pathloss model. Three such consecutive distances are then used to solve geometrically to determine (X, Y) coordinates of the client location. This method just requires the access point locations to calculate the client locations. However, this method requires exactly three access points, and basically does not work with more than three access points. Also, the credibility of this method depends heavily on the pathloss model used and can vary based on the installation environment of each store.

2) Maximum likelihood estimation: This method takes into the account the access point placement and density. It requires beforehand information on the exact floor map, the access point placement density and locations. It also requires the access points to be placed in a particular pattern, which is not always possible. The benefit of this method comes from the fact that it scales well with the number of access points deployed and with larger areas. In fact, the greater number of access points deployed, the better the accuracy is. The basis of this method is to not calculate the client location, but to make an estimation of the client location based on the RSSI value. Hence for a large mall, with different stores, an estimation on the RSSI values is made for each store/zone. Hence the client location is given based on the probability of it lying in a particular zone. This works well for different setups, as a calibration is done for each zone, but come at the price of granularity. Hence for smaller setups, the estimation does not work and not only does the error increase but granularity for each client is also drastically reduced.

In the illustrated embodiment, since the maximum likelihood estimation is insufficient for some types of Applicant's deployment, the multilateration algorithm of the present disclosure basically includes the RSSI trilateration.

As illustrated in FIG. 1, in an ideal case, the wireless device CL is located at the perfect intersection point of at least three access point regions R (three circles R1, R2 and R3 are shown in FIG. 1). In the illustrated embodiment, using the known coordinates ((xa, ya), (xb, yb) and (xc, yc)) of the access points AP1, AP2 and AP3 and the distances (da, db and dc) of the wireless device CL from the access points AP1, AP2 and AP3, three quadratic equations are formed with the client coordinates (x, y) (i.e., position of the wireless device CL) as the unknown variables. All that is left to do then is to solve them to get (x, y).

Now to calculate the distances (da, db and dc) of the wireless device CL from the access points AP1, AP2 and AP3, the RSSI values that are provided in the access point feed-reader are utilized. Specifically, to convert the RSSI values to the distances, a pathloss formula is applied. The pathloss or free space pathloss (FSPL) formula is a direct result from the Friss transmission formula and is used to calculate the total attenuation a wireless signal undergoes from the source to destination. There are many different variations of the pathloss formula which take different parameters into account. Thus, the present invention is not limited the following calculation of the distances (da, db and dc), and can calculate the distances (da, db and dc) based on a different pathloss formula based on different parameters.

In the illustrated embodiment, the formula used in the multilateration algorithm of the present disclosure is:

Received RSSI $P_r = P_{tx} - 10*n*\log_{10}(d)$

Distance $d = 10^{(P_{tx}-P_r)/10*n}$ where $P_{tx}$ represents reference power (transmitter power) of the access points AP at a distance of 1 m, and n represents pathloss coefficient.

The main code of the multilateration algorithm of the present disclosure works on the information of the reference power at 1 m. In the illustrated embodiment, with the optimizing code of the multilateration algorithm, the reference power $P_{tx}$ and the pathloss coefficient n are optimized. These main and optimizing codes of the multilateration algorithm of the present disclosure can be applied to the dual band access points AP. The only difference that needs to be done for 2.4 and 5 GHz is that the reference power $P_{tx}$ can be reduced by 6.5 db for 5 GHz. This can reduce the computation and provide accurate enough information.

Referring now to FIGS. 3, 5A and 5B, the main code of the multilateration algorithm of the present disclosure will be explained. In the illustrated embodiment, the main code of the multilateration algorithm includes the standard trilateration code. FIGS. 5A and 5B illustrate an example of the main code of the multilateration algorithm illustrated by the flowchart in FIG. 3. However, the present invention is not limited to or limited by this code and can also be realized by different programming language, for example.

In the illustrated embodiment, the controller 22 first sets the initial values of the reference power $P_{tx}$ (ptx) of the access points AP and the pathloss coefficient n (n) (step S40). In the illustrated embodiment, as illustrated in part A10 in FIG. 5A, the main code includes the following code, for example:

ptx=−30.5 #Average wifi ap received signal at a distance of <1 m n=2.5 #Pathloss coefficient The average reference power for a wireless access point is usually between −30 to −45 dbm, and the indoor pathloss coefficient is usually 1.5-5. Thus, in the illustrated embodiment, the initial value of ptx is set to −30.5, while the initial value of n is set to 2.5 for indoor scenario. Of course, the initial values can be set to different values as needed and/or desired. Basically, the reference power can be taken by manually using a receiver near an access point and measuring the RSSI value. There are plenty of applications available which can enable this on a phone, which can then be used to measure the RSSI values at different points. However, depending on the layout and obstacles present, this may vary, hence a general range has been taken. The pathloss coefficient/exponent is a property of the pathloss formula and has a big impact on the end result. These values can be calculated both analytically using different probabilistic fading models (Rayleigh, Rice, Nakagami etc.) and empirically. However, for the sake of this code, initial values are determined from the lower end of the ranges. These initial values can be optimized through the optimizing code of the multilateration algorithm. Thus, after executing the optimizing code of the multilateration algorithm, the optimized values can be used as the initial value in step S40.

Next, the controller 22 obtains the client RSSI feeds (step S42). The client RSSI feeds are continuously provided from the access points AP1, AP2 and AP3 for the wireless devices CL through the network 14, and continuously stored in the data storage 24. The controller 22 reads out the RSSI values for the wireless devices CL from the data storage 24.

The controller 22 further calculates, for each wireless device CL, the distances from the access points AP1, AP2 and AP3 based on the pathloss model (step S44) to get three distance values (da, db, dc) from the access points AP1, AP2 and AP3, respectively (step S46). In the illustrated embodiment, the controller 22 utilizes the above-mentioned formula. Specifically, as illustrated in part A12 in FIG. 5A, the main code includes the following code to calculate the distance values (da, db, dc) from the access points AP1, AP2 and AP3, respectively, based on the received RSSI values (rssi[0], rssi[1], rssi[2]) from the access points AP1, AP2 and AP3:

Distance from AP1

$x1=(ptx-rssi[0])/(10*n)$ $da=pow(10,x1)$

Distance from AP2

$x1=(ptx-rssi[1])/(10*n)$ $db=pow(10,x1)$

Distance from AP3

$x1=(ptx-rssi[2])/(10*n)$ $dc=pow(10,x1)$

Once the distance values (da, db, dc) for the wireless device CL are found, three equations with two unknown valuables about the distance between the wireless device CL and the access points AP1, AP2 and AP3 are obtained. The two unknown valuables are the position (x, y) of the wireless device CL, as shown in FIG. 1. The controller solves the equations to obtain the position (x, y) of the wireless device CL (i.e., estimated user position (xcorr, ycorr) in the following code) by the following code as illustrated in part A14 in FIG. 5B (step S48).

$va=((db*db-dc*dc)-(xb*xb-xc*xc)-(yb*yb-yc*yc))/2$ $vb=((db*db-da*da)-(xb*xb-xa*xa)-(yb*yb-ya*ya))/2$ $temp1=vb*(xc-xb)-va*(xa-xb)$ $temp2=(ya-yb)*(xc-xb)-(yc-yb)*(xa-xb)$

Estimated user position:

$ycorr=temp1/temp2$ $xcorr=(va-ycorr*(yc-yb))/(xc-xb)$ print("X co-ordinate:",xcorr)

print("Y co-ordinate:",ycorr)

In the illustrated embodiment, the scripts are written in python script. However, as mentioned above, the present invention is not limited to or limited by this code and can also be realized by different programming language, for example. The above-mentioned process is repeated for each of the wireless devices CL to obtain the position (x, y) of each of the wireless devices CL.

The final piece in this main code is to calculate the root mean square error (RMSE) (step S50). The RMSE mathematically denotes the difference in the estimated client position and the actual position that it should be. The following code has been added to serve as an indicator of how accurate the calculated positions of the wireless devices CL are, as illustrated in part A16 in FIG. 5B:

RMSE part aps=3 mse=0 for i in range(aps):

$dxcorr=pow((pow((xcorr-xp[i]),2)+pow((ycorr-yp[i]),2)),0.5)$ $mse+=pow((dxcorr-dmse[i]),2)$ print(mse/(i+1))

$rmse=pow((mse/aps),0.5)$ print("RMSE:",rmse)

Then, the controller 22 maps the calculated positions of the wireless devices CL on a floor map of the indoor space S (step S52).

Generally, the smaller the RMSE is, the more accurate the calculated positions of the wireless devices CL are. This is because, while in an ideal case, the wireless devices CL are each located on the perfect intersection of the three circles R1, R2 and R3, that is not always the case. Hence the values calculated here, on their own cannot be taken as accurate. The RMSE can then be used to minimize this, by plugging in the obtained values to calculate the distance (dxcorr) from each access point AP for each wireless device CL. This is then compared to the distance (dmse=[da, db, dc]) obtained from the RSSI value in the previous step. However, it is like an average value in all directions and not in any fixed direction. The way it works is, that for different clients, the RMSE would be different. Hence using a few fixed clients, the user could change the radio transmission parameters to see which set of values results in the lowest RMSE for all wireless devices CL. This can then be used in a machine learning way to optimize the client locations. In the illustrated embodiment, the radio transmission parameters varied here are the reference power $P_{tx}$ of the access points AP and the pathloss coefficient n.

Referring now to FIGS. 4, 6A and 6B, the optimizing code of the multilateration algorithm of the present disclosure will be explained. This optimizing code optimizes the trilateration code by finding the optimum set of the radio transmission parameters for each floor map. As mentioned above, the output of the main code depends on the initial values of the radio transmission parameters (i.e., the reference power $P_{tx}$ and pathloss coefficient n). Since they can be a general range, the optimizing code determines a fixed set of the radio transmission parameters by using a set of reference wireless devices CLr of the wireless devices CL. The reference wireless devices CLr is a fixed wireless device whose position is predetermined and prestored in the data storage 24. FIGS. 6A and 6B illustrate an example of the optimizing code of the multilateration algorithm illustrated by the flowchart in FIG. 4. However, the present invention is not limited to or limited by this code and can also be realized by different programming language, for example.

In the illustrated embodiment, as illustrated in FIG. 4, the controller 22 first obtains the client RSSI feeds (step S60). The client RSSI feeds are continuously provided from the access points AP1, AP2 and AP3 for the wireless devices CL including the reference wireless devices CLr through the network 14, and continuously stored in the data storage 24, for example. The controller 22 reads out the RSSI values for the wireless devices CL from the data storage 24, for example.

Next, the controller 22 sets the initial values of the pathloss coefficient n (n) (step S62), and the initial values of the reference power P1 (ptx) of the access points AP (step S64).

Then, the controller 22 calculates the position (x, y) of each of the wireless devices CL including the reference wireless devices CLr according to the standard trilateration code explained through steps S44 to S48 in FIG. 3 (step S66). In particular, the controller 22 calculates the position (x, y) of each of the wireless devices CL including the reference wireless devices CLr based on the RSSI values, the pathloss coefficient n and the reference power $P_{tx}$.

Furthermore, the controller 22 reads out the actual or prestored position (x, y) of each of the reference wireless devices CLr from the data storage 24 (step S68), and compares the calculated positions (x, y) of the reference wireless devices CLr calculated in step S66 with the actual or prestored positions (x, y) of the reference wireless devices CLr obtained in step S68 (step S70). Specifically, the controller 22 calculates an average of the positional errors (i.e., distances) between the calculated position (x, y) and the actual position (x, y) for the reference wireless devices CLr.

These steps are repeated for all possible vales of the radio transmission parameters within the general range, or are repeated until the calculated average of the positional errors becomes the lowest.

Specifically, the controller 22 determines whether the calculated average of the positional errors becomes the lowest (step S72). If the controller 22 determines that the calculated average of the positional errors is not the lowest ("No" in step S72), then the controller 22 discards calculated values (step S74) and determines whether the number of count of the loop has reached its maximum value (step S76). In the illustrated embodiment, the maximum value is set to 10, for example. If the controller 22 determines that the number of count of the loop for setting the reference power P1 (ptx) has not reached its maximum value ("No" in step S76), then the controller 22 increases the set value of the reference power $P_{tx}$ (ptx) by a predetermined value, such as 0.5 (step S78), and the process returns to step S66.

On the other hand, if the controller 22 determines that the number of count of the loop has reached its maximum value ("Yes" in step S76), then the controller 22 determines whether the number of count of the loop for the pathloss coefficient n (n) has reached its maximum value (step S80). In the illustrated embodiment, the maximum value is set to 10, for example. If the controller 22 determines that the number of count of the loop has not reached its maximum value ("No" in step S80), then the controller 22 increases the set value of the pathloss coefficient n (n) by a predetermined value, such as 0.25 (step S82), and the process returns to step S64 and the above-mentioned processes are repeated.

Furthermore, if the controller 22 determines that the number of count of the loop has reached its maximum value ("Yes" in step S80), then the controller 22 sets the current values of the reference power $P_{tx}$ (ptx) and the pathloss coefficient n (n) as the optimized values of the radio transmission parameters (step S84).

On the other hand, if the controller 22 determines that the calculated average of the positional errors becomes the lowest ("Yes" in step S72), then the controller 22 saves the current values of the reference power $P_{tx}$ (ptx) and the pathloss coefficient n (n) (step S86), and sets the current values of the reference power P1 (ptx) and the pathloss coefficient n (n) as the optimized values of the radio transmission parameters (step S84).

Furthermore, the controller 22 calculates the position (x, y) of each of the wireless devices CL based on the optimized values of the radio transmission parameters (step S88). Specifically, the controller 22 calculates the position (x, y) of each of the wireless devices CL according to the standard trilateration code explained through steps S44 to S48 in FIG. 3 using the optimized values of the radio transmission parameters. Then, the controller 22 calculates the RMSE in a manner same as step S50 (step S90), and maps the calculated positions of the wireless devices CL on a floor map of the indoor space S in a manner same as step S52 (step S92).

In the illustrated embodiment, the set of values of the radio transmission parameters that show the least error can be used for each floor map. Each floor map is different, and needs different sets of values of the radio transmission parameters. Thus, the optimizing code of the multilateration algorithm of the present disclosure is run once per floor map to determine optimized values of the radio transmission parameters for the floor map, and the multilateration algorithm can be customized for each environment. Furthermore, after determining the optimized values of the radio transmission parameters for the floor map, these optimized values are utilized as the initial values of the radio transmission parameters for the main code of the multilateration algorithm shown in FIGS. 3, 5A and 5B.

Figure 7:
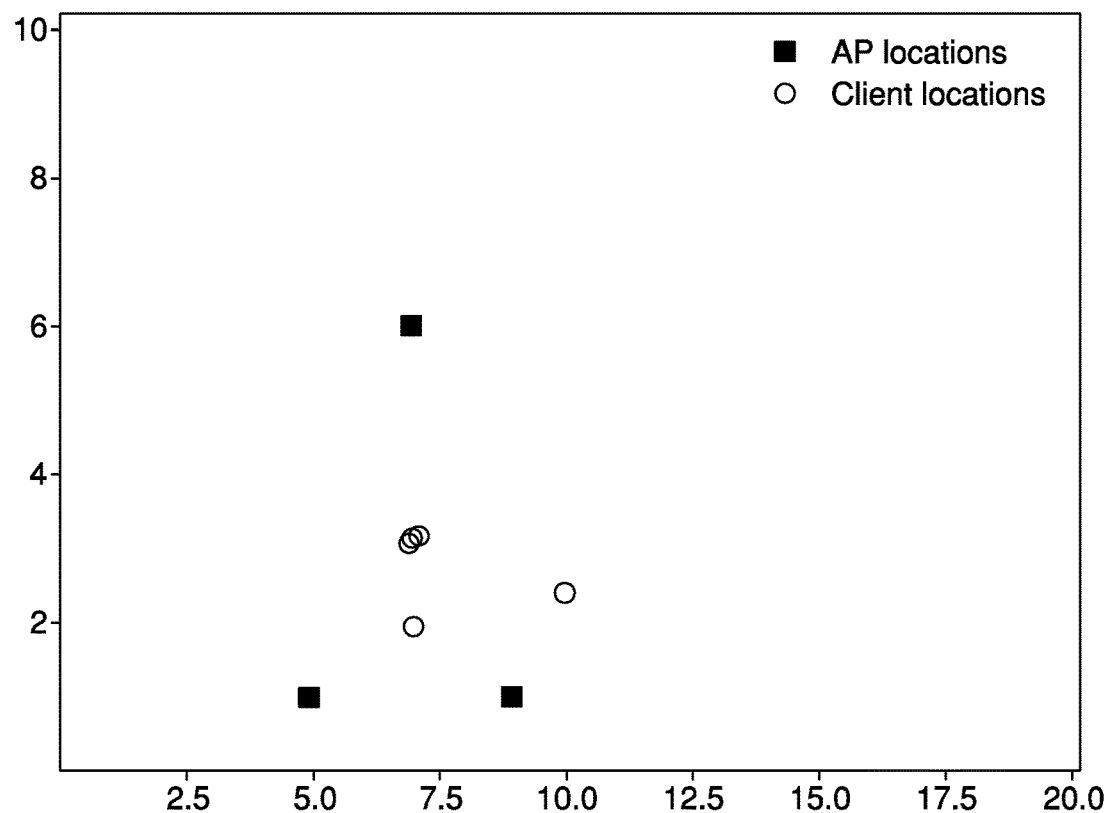
FIG. 7 illustrates a diagram of calculation results of a multilateration algorithm in accordance with a comparative example, illustrating access point locations and client locations determined by the multilateration algorithm in accordance with the comparative example.
Figure 8:
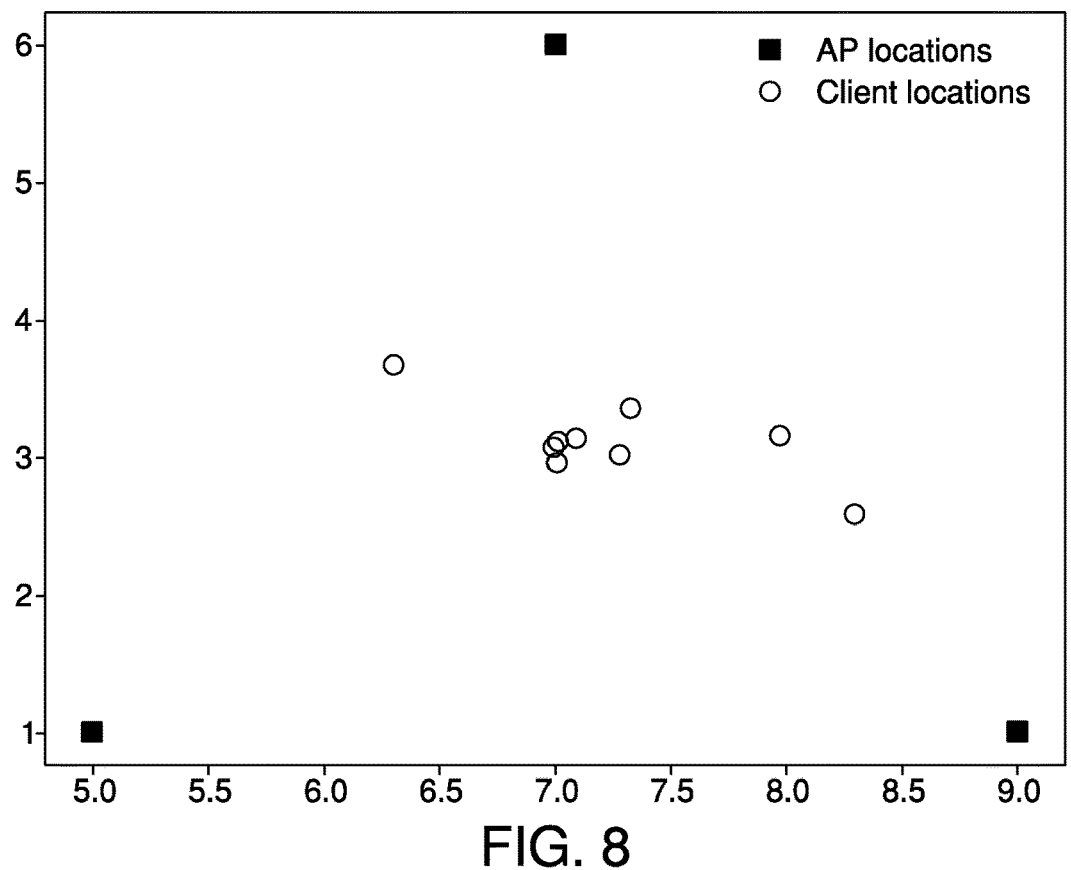
FIG. 8 illustrates a diagram of calculation results of the multilateration algorithm in accordance with the one embodiment of the present disclosure, illustrating access point locations and client locations determined by the multilateration algorithm in accordance with the one embodiment of the present disclosure.

Referring now to FIGS. 7 and 8, the location mapping results of the multilateration algorithm will be explained. FIG. 7 illustrates location mapping results using the trilateration code with initial values (ptx=−30 dbm, n=2), while FIG. 8 illustrates location mapping results using the trilateration code with optimized values (ptx=−34.5 dbm, n=4.25) that are determined through the optimizing code of the multilateration algorithm of the present disclosure.

FIG. 7 shows that all the client locations are clumped together around the middle, while FIG. 8 shows that there are not only more client locations seen separately but they are also more spread out. Furthermore, the average RMSE in the case shown in FIG. 7 is 27, while the average RMSE in the case shown in FIG. 8 is 1.42, which shows the difference in performance between the two cases.

Thus, with the optimizing code of the multilateration algorithm, as shown in FIG. 8, the positions of the wireless devices CL on the floor map can be accurately identified. In the illustrated embodiment, the optimization of the radio transmission parameters is performed for 10 levels. In other words, 10 different values are tested for each radio transmission parameters. In the illustrated embodiment, for this setup, the pathloss coefficient n (n) has been found to have a major effect on the RMSE relative to the reference power $P_{tx}$ (ptx).

Of course, the optimized value can be different for different setup. For example, in one case, according to the pathloss algorithm, the reference power of the access point is around −30 dbm, while the Aruba solution predicts it to be around −45 dbm, with pathloss coefficient around 1.5 to 2. On the other hand, in this case, with the optimizing code of the multilateration algorithm, the optimized value of the reference power $P_{tx}$ is −39 dbm and the optimized value of the pathloss coefficient n is 4.4.

Figure 9:
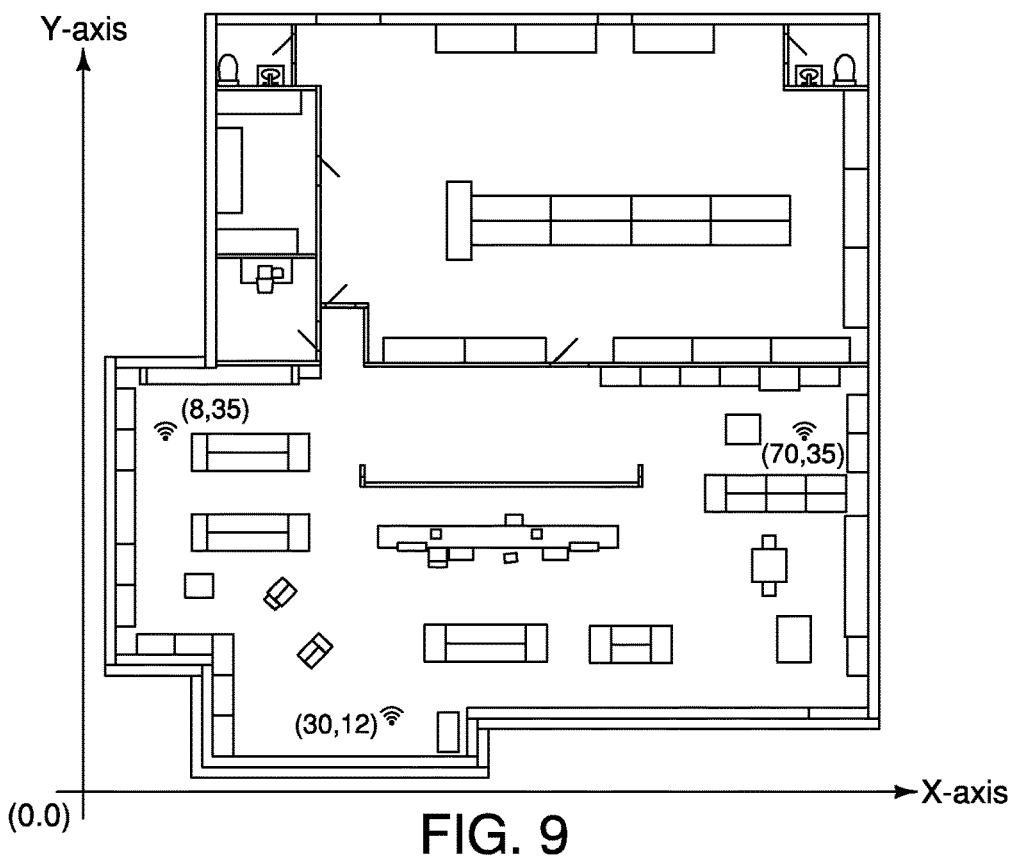
FIG. 9 illustrates a diagram of a floor map of an indoor space of a store, in which access points are installed.
Figure 10:
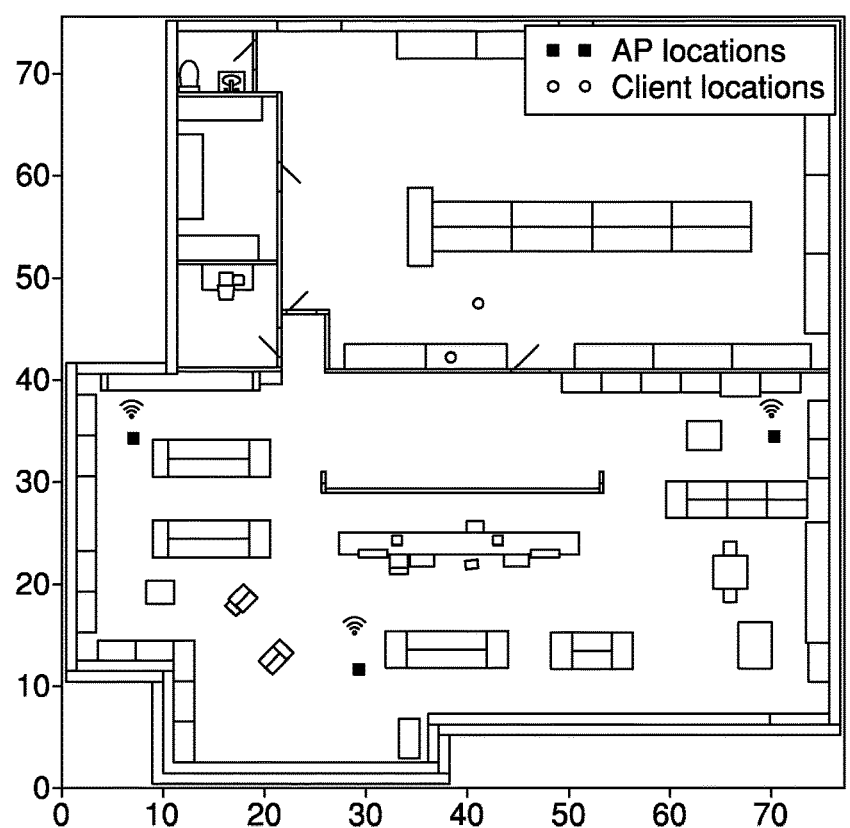
FIG. 10 illustrates a diagram of the floor map of the indoor space of the store shown in FIG. 9, illustrating location mapping results of the multilateration algorithm in accordance with a comparative example.
Figure 11:
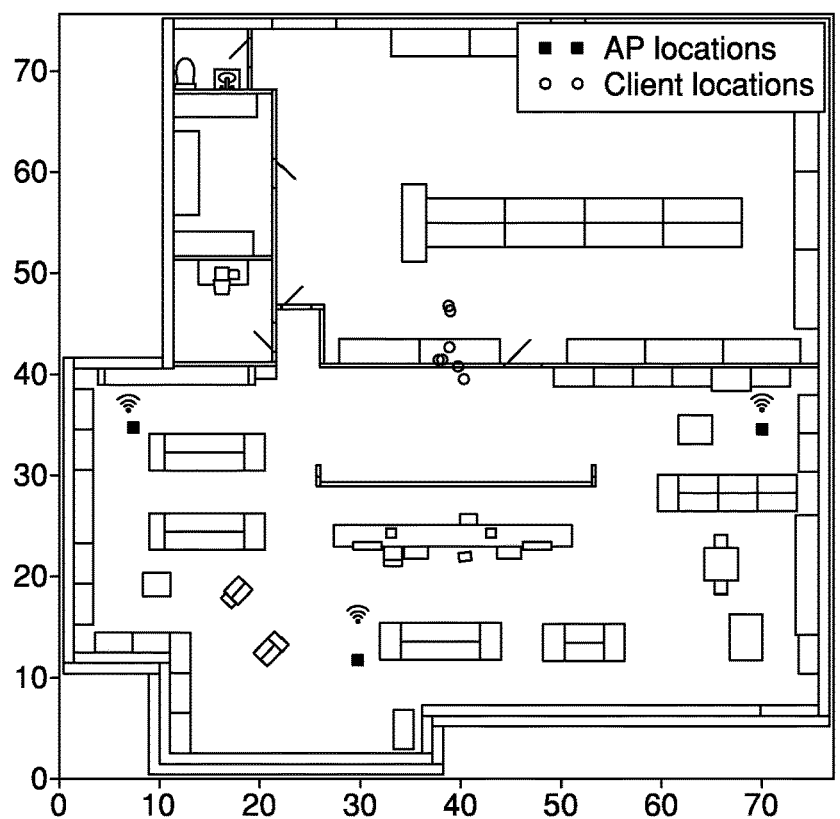
FIG. 11 illustrates a diagram of the floor map of the indoor space of the store shown in FIG. 9, illustrating location mapping results of the multilateration algorithm in accordance with the one embodiment of the present disclosure.

Furthermore, FIGS. 9-11 illustrate store floor map images on which the location mapping results are overlaid to show a heatmap of the customer traffic flow in the floor map. Specifically, the store floor map image can be provided by the multilateration server 12, and be displayed on a display of a user, such as a manager of the store, who is accessible to the multilateration system 10 via the network 14.

FIG. 9 illustrates the store floor map image on which three access points are located. FIG. 10 illustrates the store floor map image on which the location mapping results obtained by the standard trilateration code without optimizing the radio transmission parameters. This case requires a minimum of three access points. FIG. 11 illustrates the store floor map image on which the location mapping results obtained by the main code of the multilateration algorithm after optimizing the radio transmission parameters. In this case, the multilateration algorithm utilizes information of the three access points AP1, AP2 and AP3. Referring to FIGS. 10 and 11, it can be seen that with the multilateration algorithm of the present disclosure, there are not only more client locations seen separately but they are also more spread out.

In the illustrated embodiment, the main and optimizing codes of the multilateration algorithm utilizes the RSSI feeds from the three access points AP1, AP2 and AP3. However, the present invention is not limited to this. The main and optimizing codes of the multilateration algorithm can utilize the RSSI feeds from more than three access points. Theoretically, increasing the number of access points can improve the accuracy of calculation of the positions of the wireless devices CL.

Furthermore, the main and optimizing codes of the multilateration algorithm can utilize the RSSI feeds from less than three access points. Generally, reducing the number of access points reduces the accuracy of calculation of the positions of the wireless devices CL. However, in the illustrated embodiment, to perform the trilateration based on the RSSI feeds from less than three access points, certain assumptions on the RSSI feeds are made to calculate the positions of the wireless devices CL. Specifically, the multilateration algorithm replicates the RSSI feeds for a missing access point. Although this may not give an accurate location, this code is preferable to be included in the main and optimizing codes of the multilateration algorithm because it is seen that a certain wireless device CL, while being present in site of all three access points, show only a single RSSI feed. While this needs to be taken care of by the access point manufacturer side, with the multilateration algorithm of the present application, this loss of data is compensated by assuming the missing RSSI feeds. For example, when two RSSI feeds from two access points can only be received, the multilateration server 12 generates the third RSSI feed as an average of the received two RSSI feeds from the two access points. This by default has to only be turned on for wireless devices CL within an acceptable RSSI range, i.e., wireless devices CL with RSSI value less than −50 dbm. In this case, it is ensured that this assumption is only applied for wireless devices CL that are present in the same location as the access points, and is prevented from being applied for a wireless device of passersby.

Figure 12:
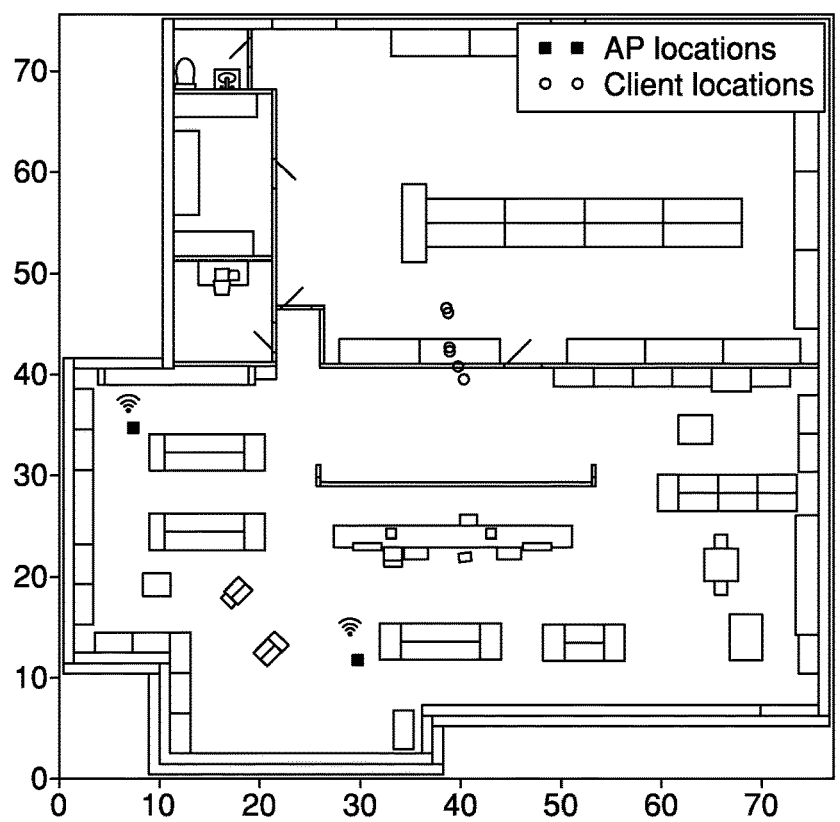
FIG. 12 illustrates a diagram of the floor map of the indoor space of the store shown in FIG. 9, illustrating location mapping results of a multilateration algorithm in accordance with a modified example of the one embodiment of the present disclosure.

FIG. 12 illustrates the store floor map image on which the location mapping results obtained based on only two RSSI feeds received from two access points AP. Referring to FIG. 12, it can be seen that there are not only more client locations seen separately but they are also more spread out relative to the location mapping results shown in FIG. 10.

In the illustrated embodiment, the main and optimizing codes of the multilateration algorithm can be applied to dual Wi-Fi modes (i.e., 2.4 and 5 GHz), and cover different radio scenarios that can be deployed. In the case of the indoor LOS propagation model, the difference in 2.4 GHz and 5 GHz pathloss is about 6.5 to 7 db. Thus, when the RSSI feeds come from 5 Ghz antenna, then the reference power at 1 m used in the main and optimizing codes needs to be reduced by 6.5 to 7 db. Practically, this is enough accurate, and can reduce the complexity of modelling of a different pathloss scenario for each case.

In the illustrated embodiment, the multilateration algorithm for calculating the positions (client locations) of the wireless devices CL based on the RSSI feeds can be provided. Furthermore, the multilateration algorithm of the present disclosure can be properly applied even when the distance between the access points are not large, where the currently deployed solutions, such as Aruba networks solution, does not properly work. The multilateration algorithm of the present disclosure is a method to not only control the client locations but also to improve them under understanding of the sites.

In the illustrated embodiment, a solution is provided to a problem in which the RSSI feeds are obtained from only less than three access points (even when the wireless device CL is in LOS of all access points) while at least three RSSI feeds being required. Specifically, with the multilateration algorithm of the present disclosure, an average of two RSSI feeds (RSSI values) is utilized to compensate for another RSSI feed.

Furthermore, in the illustrated embodiment, the RSSI feeds from more than three access points can optionally be utilized, which theoretically improves the accuracy of the calculation. However, this modification is not always necessary in the market of small format stores, such as small retailers, restaurants, banks and the like, where three access points can cover the entire indoor space. Specifically, the multilateration algorithm of the present disclosure can be effectively utilized for the sites where there are two or three access points within an area smaller than 50 m. Since each access point can basically cover 2000-3000 ft, in such sites, probability-based location mapping can induce high error and at times does not work, which is a shortcoming of the conventional algorithms. In such scenarios, the multilateration algorithm of the present disclosure can be more beneficial.

In the illustrated embodiment, the multilateration algorithm of the present disclosure can be applied for any types of Wi-Fi access points. The multilateration algorithm basically work with three access points, but can also work with only two access points as mentioned above. This can provide a unique analytics solution and an ability to be competitive in the Wi-Fi market.

In the illustrated embodiment, the multilateration server 12 (e.g., the multilateration device) includes the controller 22 (e.g., the processor). The controller 22 is configured to receive the RSSI (e.g., the signal strength indicator) for the wireless devices CL (e.g., the at least one client wireless device) from the access points AP (e.g., the plurality of access point devices). The controller 22 is further configured to calculate the position (x, y) of the wireless devices CL based on the RSSI for the wireless devices CL, the prestored positions ((xa, ya), (xb, yb), (xc, yc)) of the access points AP and the radio transmission parameters. The radio transmission parameters are obtained as a value that minimizes the positional errors (fixedClientError in FIG. 6B) between the calculated positions (xcorr, ycorr in FIG. 6B) of the reference wireless devices CLr (e.g., at least one reference wireless device) and the actual position (xFixed, yFixed in FIG. 6B) (e.g., the prestored position) of the reference wireless devices CLr.

In the illustrated embodiment, the controller 22 is further configured to calculate the position of the wireless devices CL by calculating the distance values (dmse=[da, db, dc]) (e.g., the first distances) between the wireless devices CL and the access points AP, respectively, based on the RSSI for the wireless devices CL and the radio transmission parameters, and calculating the position (xcorr, ycorr) of the wireless devices CL based on the distance values (da, db, dc) and the prestored positions ((xa, ya), (xb, yb), (xc, yc)) of the access points AP.

In the illustrated embodiment, the controller 22 is further configured to calculate the RMSE (e.g., the error) between the distance values (dmse=[da, db, dc]) and the distances (dxcorr) (e.g., the second distances) between the wireless devices CL and the access points AP. The distances (dxcorr) is calculated based on the position (xcorr, ycorr) of the wireless devices CL and the prestored positions ((xa, ya), (xb, yb), (xc, yc)) of the access points AP.

In the illustrated embodiment, the error between the distance values (dmse=[da, db, dc]) and the distances (dxcorr) (e.g., the second distances) between the wireless devices CL and the access points AP is calculated as a root mean square error.

In the illustrated embodiment, the controller 22 is further configured to obtain the radio transmission parameter by receiving the RSSI (e.g., the signal strength indicator) for the reference wireless devices CLr from the access points AP, calculating the calculated position (xcorr, ycorr) of the reference wireless devices CLr based on the RSSI for the reference wireless devices CLr, the prestored positions ((xa, ya), (xb, yb), (xc, yc)) of the access points AP and the radio transmission parameter while changing the radio transmission parameter, and determining the value that minimizes the positional errors between the calculated positions (xcorr, ycorr) of the reference wireless devices CLr and the actual position (xFixed, yFixed) of the reference wireless devices CLr.

In the illustrated embodiment, the controller 22 is further configured to calculate the calculated position (xcorr, ycorr) of the reference wireless devices CLr by calculating the distance values (dmse=[da, db, dc]) (e.g., the distances) between the reference wireless devices CLr and the access points AP, respectively, based on the RSSI for the reference wireless device CLr and the radio transmission parameter while changing the radio transmission parameter, and calculating the calculated position (xcorr, ycorr) of the reference wireless devices CLr based on the distance values (da, db, dc) between the reference wireless devices CLr and the access points AP and the prestored positions ((xa, ya), (xb, yb), (xc, yc)) of the access points AP.

In the illustrated embodiment, the radio transmission parameter includes the reference power $P_{tx}$ (ptx) (e.g., transmission power) of the access points AP and the pathloss coefficient n (n) (e.g., transmission pathloss coefficient).

In the illustrated embodiment, the access points AP are installed in the indoor space S.

In the illustrated embodiment, the controller 22 is further configured to map the position (x, y) of the wireless devices CL on a floor map of the indoor space S.

In the illustrated embodiment, the multilateration system 10 includes the access points AP (e.g., the plurality of access point devices) and the multilateration server 12 (e.g., the multilateration device). The access points AP are configured to connect to the wireless devices CL (e.g., at least one client wireless device) and output the RSSI (e.g., the signal strength indicator) for the wireless devices CL. The multilateration server 12 is configured to receive the RSSI from the access points AP and calculate the position (x, y) of the wireless devices CL based on the RSSI for the wireless device CL, the prestored positions ((xa, ya), (xb, yb), (xc, yc)) of the access points AP and the radio transmission parameters. The radio transmission parameters are obtained as a value that minimizes the positional errors (fixedClientError in FIG. 6B) between the calculated positions (xcorr, ycorr in FIG. 6B) of the reference wireless devices CLr (e.g., at least one reference wireless device) and the actual position (xFixed, yFixed in FIG. 6B) (e.g., the prestored position) of the reference wireless devices CLr.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A multilateration method comprising:
   receiving a signal strength indicator for at least one client wireless device from a plurality of access point devices installed at an indoor space, with the signal strength indicator being indicative of power level that the at least one client wireless device is receiving from each of the access point devices, the plurality of access point devices including a networking hardware device that allows the at least one client wireless device to connect to a network;
   calculating a position of the at least one client wireless device using at least one mathematical algorithm which includes inputs based on the signal strength indicator for the at least one client wireless device, prestored positions of the access point devices and a radio transmission parameter; and
   mapping the position of the at least one client wireless device on a floor map of the indoor space,
   the radio transmission parameter being obtained as a value that minimizes an error between a calculated position of at least one reference wireless device and a prestored position of the at least one reference wireless device.

2. The multilateration method according to claim 1, wherein
   the calculating of the position of the at least one client wireless device includes
   calculating first distances between the at least one client wireless device and the access point devices, respectively, based on the signal strength indicator for the at least one client wireless device and the radio transmission parameter, and
   calculating the position of the at least one client wireless device based on the first distances and the prestored positions of the access point devices.

3. The multilateration method according to claim 2, further comprising
calculating an error between the first distances and second distances between the at least one client wireless device and the access point devices, the second distances being calculated based on the position of the at least one client wireless device and the prestored positions of the access point devices.

4. The multilateration method according to claim 1, wherein
the radio transmission parameter includes a transmission power of the access point devices and a transmission pathloss coefficient.

5. A multilateration method comprising:
receiving a signal strength indicator for at least one client wireless device from a plurality of access point devices, with the signal strength indicator being indicative of power level that the at least one client wireless device is receiving from each of the access point devices;
calculating a position of the at least one client wireless device based on the signal strength indicator for the at least one client wireless device, prestored positions of the access point devices and a radio transmission parameter, the calculating of the position of the at least one client wireless device including
calculating first distances between the at least one client wireless device and the access point devices, respectively, based on the signal strength indicator for the at least one client wireless device and the radio transmission parameter, and
calculating the position of the at least one client wireless device based on the first distances and the prestored positions of the access point devices; and
calculating an error between the first distances and second distances between the at least one client wireless device and the access point devices, the second distances being calculated based on the position of the at least one client wireless device and the prestored positions of the access point devices,
the radio transmission parameter being obtained as a value that minimizes an error between a calculated position of at least one reference wireless device and a prestored position of the at least one reference wireless device,
the error between the first distances and the second distances is calculated as a root mean square error.

6. The multilateration method according to claim 1, wherein
the radio transmission parameter being obtained by
receiving a signal strength indicator for the at least one reference wireless device from the access point devices,
calculating the calculated position of the at least one reference wireless device based on the signal strength indicator for the at least one reference wireless device, the prestored positions of the access point devices and the radio transmission parameter while changing the radio transmission parameter, and
determining the value that minimizes the error between the calculated position of the at least one reference wireless device and the prestored position of the at least one reference wireless device.

7. A multilateration method comprising:
receiving a signal strength indicator for at least one client wireless device from a plurality of access point devices, with the signal strength indicator being indicative of power level that the at least one client wireless device is receiving from each of the access point devices, the plurality of access point devices including a networking hardware device that allows the at least one client wireless device to connect to a network; and
calculating a position of the at least one client wireless device using at least one mathematical algorithm which includes inputs based on the signal strength indicator for the at least one client wireless device, prestored positions of the access point devices and a radio transmission parameter,
the radio transmission parameter being obtained as a value that minimizes an error between a calculated position of at least one reference wireless device and a prestored position of the at least one reference wireless device,
the radio transmission parameter being obtained by
receiving a signal strength indicator for the at least one reference wireless device from the access point devices,
calculating the calculated position of the at least one reference wireless device based on the signal strength indicator for the at least one reference wireless device, the prestored positions of the access point devices and the radio transmission parameter while changing the radio transmission parameter, and
determining the value that minimizes the error between the calculated position of the at least one reference wireless device and the prestored position of the at least one reference wireless device,
the calculated position of the at least one reference wireless device calculated by
calculating distances between the at least one reference wireless device and the access point devices, respectively, based on a signal strength indicator for the at least one reference wireless device and the radio transmission parameter while changing the radio transmission parameter, and
calculating the calculated position of the at least one reference wireless device based on the distances between the at least one reference wireless device and the access point devices and the prestored positions of the access point devices.

8. A multilateration device comprising:
a processor configured to receive a signal strength indicator for at least one client wireless device from a plurality of access point devices installed at an indoor space, with the signal strength indicator being indicative of power level that the at least one client wireless device is receiving from each of the access point devices, the plurality of access point devices including a networking hardware device that allows the at least one client wireless device to connect to a network,
the processor being further configured to calculate a position of the at least one client wireless device using at least one mathematical algorithm which includes inputs based on the signal strength indicator for the at least one client wireless device, prestored positions of the access point devices and a radio transmission parameter,
the processor being further configured to map the position of the at least one client wireless device on a floor map of the indoor space,
the radio transmission parameter being obtained as a value that minimizes an error between a calculated position of at least one reference wireless device and a prestored position of the at least one reference wireless device.

9. The multilateration device according to claim 8, wherein
the processor is further configured to calculate the position of the at least one client wireless device by
calculating first distances between the at least one client wireless device and the access point devices, respectively, based on the signal strength indicator for the at least one client wireless device and the radio transmission parameter, and
calculating the position of the at least one client wireless device based on the first distances and the prestored positions of the access point devices.

10. The multilateration device according to claim 9, wherein
the processor is further configured to calculate an error between the first distances and second distances between the at least one client wireless device and the access point devices, the second distances being calculated based on the position of the at least one client wireless device and the prestored positions of the access point devices.

11. The multilateration device according to claim 8, wherein
the processor is further configured to obtain the radio transmission parameter by
receiving a signal strength indicator for the at least one reference wireless device from the access point devices,
calculating the calculated position of the at least one reference wireless device based on the signal strength indicator for the at least one reference wireless device, the prestored positions of the access point devices and the radio transmission parameter while changing the radio transmission parameter, and
determining the value that minimizes the error between the calculated position of the at least one reference wireless device and the prestored position of the at least one reference wireless device.

12. The multilateration device according to claim 8, wherein
the radio transmission parameter includes a transmission power of the access point devices and a transmission pathloss coefficient.

13. A multilateration device comprising:
a processor configured to
receive a signal strength indicator for at least one client wireless device from a plurality of access point devices, with the signal strength indicator being indicative of power level that the at least one client wireless device is receiving from each of the access point devices,
calculate a position of the at least one client wireless device based on the signal strength indicator for the at least one client wireless device, prestored positions of the access point devices and a radio transmission parameter, the position calculated by
calculating first distances between the at least one client wireless device and the access point devices, respectively, based on the signal strength indicator for the at least one client wireless device and the radio transmission parameter, and calculating the position of the at least one client wireless device based on the first distances and the prestored positions of the access point devices,
calculate an error between the first distances and second distances between the at least one client wireless device and the access point devices, the second distances being calculated based on the position of the at least one client wireless device and the prestored positions of the access point devices,
the radio transmission parameter being obtained as a value that minimizes an error between a calculated position of at least one reference wireless device and a prestored position of the at least one reference wireless device,
the error between the first distances and the second distances is calculated as a root mean square error.

14. A multilateration device comprising:
a processor configured to receive a signal strength indicator for at least one client wireless device from a plurality of access point devices, with the signal strength indicator being indicative of power level that the at least one client wireless device is receiving from each of the access point devices, the plurality of access point devices including a networking hardware device that allows the at least one client wireless device to connect to a network,
the processor being further configured to calculate a position of the at least one client wireless device using at least one mathematical algorithm which includes inputs based on the signal strength indicator for the at least one client wireless device, prestored positions of the access point devices and a radio transmission parameter,
the radio transmission parameter being obtained as a value that minimizes an error between a calculated position of at least one reference wireless device and a prestored position of the at least one reference wireless device,
the processor being further configured to obtain the radio transmission parameter by
receiving a signal strength indicator for the at least one reference wireless device from the access point devices,
calculating the calculated position of the at least one reference wireless device based on the signal strength indicator for the at least one reference wireless device, the prestored positions of the access point devices and the radio transmission parameter while changing the radio transmission parameter, and
determining the value that minimizes the error between the calculated position of the at least one reference wireless device and the prestored position of the at least one reference wireless device
the processor being further configured to calculate the calculated position of the at least one reference wireless device by
calculating distances between the at least one reference wireless device and the access point devices, respectively, based on a signal strength indicator for the at least one reference wireless device and the radio transmission parameter while changing the radio transmission parameter, and
calculating the calculated position of the at least one reference wireless device based on the distances between the at least one reference wireless device and the access point devices and the prestored positions of the access point devices.

15. A multilateration system comprising:

a plurality of access point devices configured to connect to at least one client wireless device and output a signal strength indicator for the at least one client wireless device, with the signal strength indicator being indicative of power level that the at least one client wireless device is receiving from each of the access point devices, the plurality of access point devices including a networking hardware device that allows the at least one client wireless device to connect to a network; and a multilateration device configured to receive the signal strength indicator from the access point devices and calculate a position of the at least one client wireless device using at least one mathematical algorithm which includes inputs based on the signal strength indicator for the at least one client wireless device, prestored positions of the access point devices and a radio transmission parameter, the multilateration device configured to calculate the position of the at least one client wireless device by calculating first distances between the at least one client wireless device and the access point devices, respectively, based on the signal strength indicator for the at least one client wireless device and the radio transmission parameter, and calculating the position of the at least one client wireless device based on the first distances and the prestored positions of the access point devices, the radio transmission parameter being obtained as a value that minimizes an error between a calculated position of at least one reference wireless device and a prestored position of the at least one reference wireless device.

* * * * *